UNITED STATES PATENT OFFICE.

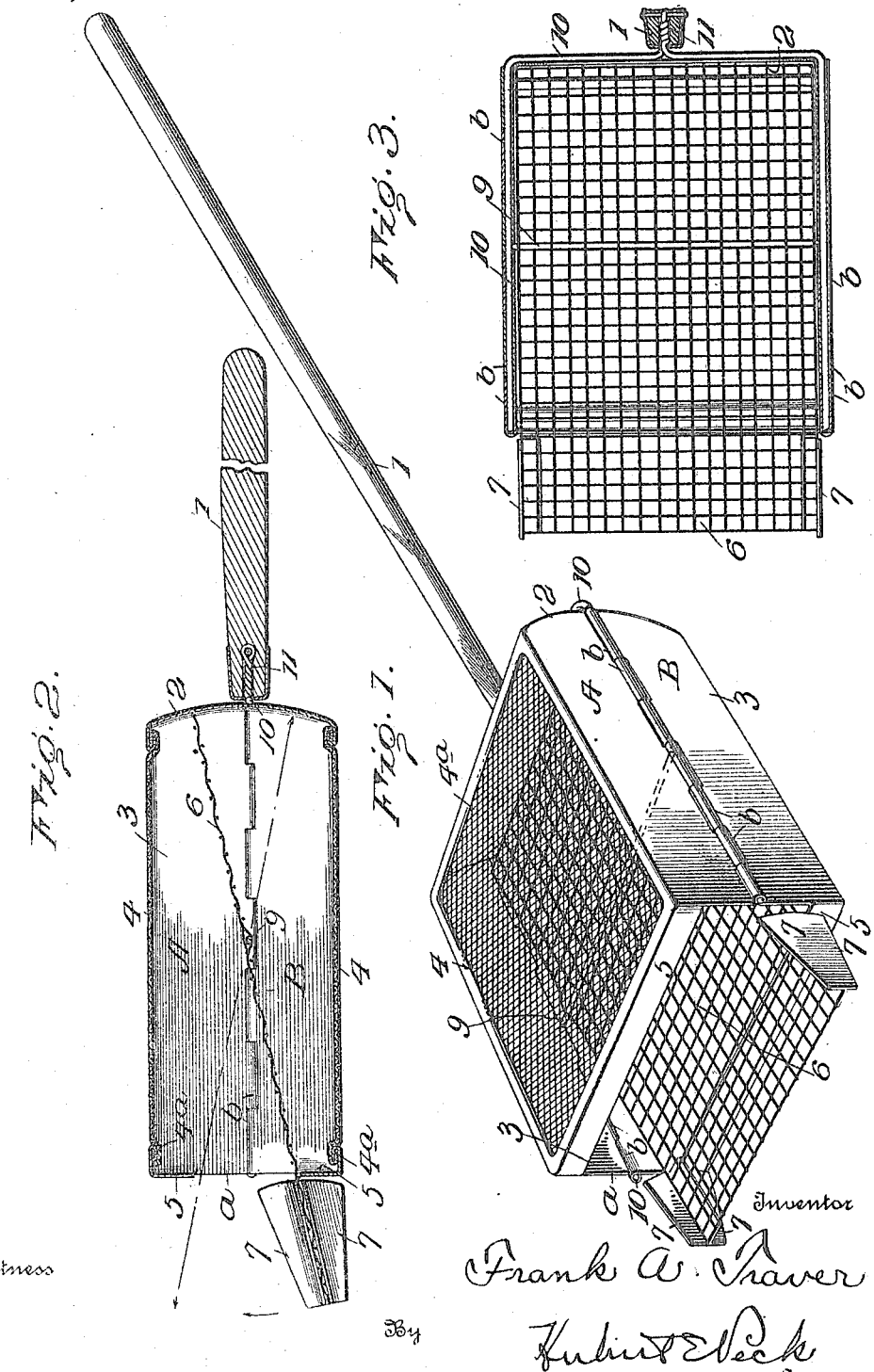

FRANK A. TRAVER, OF MILWAUKEE, WISCONSIN.

CORN-POPPER AND ANALOGOUS DEVICE.

1,208,239.   Specification of Letters Patent.   Patented Dec. 12, 1916.

Application filed September 2, 1915. Serial No. 48,656.

*To all whom it may concern:*

Be it known that I, FRANK A. TRAVER, a citizen of the United States, residing at Milwaukee, in the county of Milwaukee and State of Wisconsin, have invented certain new and useful Improvements in Corn-Poppers and Analogous Devices, of which the following is a specification.

This invention relates to certain improvements in corn poppers and analogous devices; and the objects and nature of the invention will be readily understood by those skilled in the art in the light of the following explanations of the accompanying drawings illustrating what I now believe to be the preferred mechanical expression of the invention from among other forms, constructions and arrangements within the spirit and scope thereof.

An object of the invention is to provide a comparatively simple, durable and inexpensive hand operated corn popper embodying improved means for separating the popped corn from the unpopped corn and for discharging the popped corn from the popper.

A further object of the invention is to provide improvements in corn poppers to facilitate the discharge of the popped corn therefrom while retaining the unpopped corn therein.

A further object of the invention is to provide a corn popper embodying a movable screen controlling the popped corn outlet from the popper and for separating the popped from the unpopped corn preparatory to permitting discharge of the popped corn.

A further object of the invention is to provide a reversible corn popper, internally divided by a vertically swingable screen, into two chambers either of which constitutes a popped corn chamber while the other forms an unpopped corn chamber, said screen extending into the discharge from said popper and swingable vertically therein on the reversal of the popper to permit discharge of popped corn from either side of the screen and from either chamber.

A further object of the invention is to provide certain improvements in combinations and arrangements of elements to produce a highly efficient and desirable corn popper.

The invention consists in certain novel combinations and arrangements of parts and features as more fully and particularly set forth hereinafter.

Referring to the accompanying drawings:—Figure 1, is a perspective view of a popper involving my invention. Fig. 2, is a longitudinal sectional view thereof. Fig. 3, is a horizontal longitudinal section.

The popper illustrated, comprises a box or inclosed casing having a discharge opening *a*, at one end, and an elongated handle 1, rigid with and projecting from its opposite end. This box has a closed front end edge wall 2, and closed opposite side edge walls 3, while the rear end edge is closed except for the discharge opening *a*, arranged midway between the opposite top and bottom side walls 4, and extending the full length of the end between the edge walls 3. The opening is less than the vertical width of the box, hence leaving the short rear edge walls or flanges 5, above and below the opening and preferably similar in dimensions.

The flat walls 4, are reticulated or composed of screens of fine mesh to uphold small unpopped corn and permit ready access of heat thereto and also to render the corn within the box clearly visible from the exterior thereof. The interior of the box is longitudinally divided into two horizontal or upper and lower chambers by a longitudinal screen 6, of relatively large mesh with respect to the reticulated walls 4, to permit passage of unpopped corn therethrough and to withhold popped corn and thereby separate the unpopped corn therefrom. The width of this screen is approximately equal to the internal width of the box, while the screen extends from the wall 2, of the box rearwardly throughout the length of the box and through the opening *a*, and projects rearwardly beyond the same. The space in the box below this screen is designed to form the popping chamber, and as the box is reversible either chamber becomes a popping chamber according to the position of the box.

During the popping operation, the screen 6, forms the top wall or cover of the popping chamber. When the box is reversed, the just mentioned chamber becomes the upper chamber, and the other chamber becomes the popping chamber, and during the reversing operation the unpopped corn falls through the screen from one chamber to the other but the popped corn is caught by the screen and remains on the upper surface thereof on the completion of the reversing movement. This popped corn rolls or otherwise moves rearwardly along the screen and passes from the box through opening a, and drops from the screen into a dish or other receptacle which can be provided for the purpose.

The rearwardly projecting end of the screen is preferably constructed or arranged to form a discharge chute or hopper at both side faces of the screen end. For instance, I show the end of the screen in rear of the opening a, provided with longitudinally arranged vertical flanges 7. These flanges are double or upwardly and downwardly extending to guard both side faces of the projecting or chute end of the screen to guide the popped corn from the screen when either side of the box is uppermost. If so desired, the screen can be vertically swingable to always assume a downwardly and rearwardly inclined position to facilitate the discharge of popped corn therefrom, and to close the popping chamber from the discharge opening a. In the particular example illustrated I show the screen carried by and swingable on an intermediate transverse axis 9, mounted in the edge walls 3, midway between the upper and lower side walls 4, and approximately midway the length of the box, although my invention is not limited to any particular location of the axis, nor in all respects is the invention limited to a swingable or otherwise movable screen.

Where the screen is mounted to swing on an intermediate axis, the opposite ends of the screen move vertically in opposite directions when the box is reversed, and the screen is limited in its swing by the vertical width of the discharge opening a, and by engagement with the upper edge of the lower flange or wall 5, while the front end wall is preferably curved vertically approximately concentric with the axis on which the screen rocks to reduce to the minimum possibility of kernels of corn becoming caught between the inner surface of said wall and the end edge of the screen. When the box is reversed, the screen swings vertically by gravity, particularly as its rear end is preferably heavier than its front end, and the unpopped corn falls through the screen while the popped corn is caught thereby and rests on the downwardly and rearwardly inclined top surface thereof and by shaking the box is caused to pass therefrom through the discharge opening at the rear end of the box.

As fast as any desirable quantity of corn reaches the desired condition, the box can be reversed to discharge the popped corn before it becomes scorched, and to separate the unpopped corn therefrom which will then be more thoroughly exposed and subjected to the heat of the fire.

I do not wish to limit my invention to any particular box formation, nor to the closed and reticulated form of walls described. However, in the specific example illustrated, I show the box composed of two similar upper and lower sections A, B, which can be drawn or struck up from sheet metal blanks by the same dies. The center of each blank or section is cut out to receive the reticulated wall 4, which when composed of a sheet of wire gauze can be secured at its edges to the sheet metal edges around said opening by any suitable seam, such as 4ª, for instance.

The struck up side flanges of each section are formed with similar out turned curved or semi-cylindrical lips b, uniformly spaced apart a distance approximately equal to the width of a lip, and with the lips of one flange staggered with respect to the lips of the other flange. Thus when one section is reversed and placed on the other section, as illustrated, the lips interlock and form a channel to receive the comparatively heavy wire 10. When the two similar sections have been thus brought together so that their intermeshing curved lips fit and partially embrace said wire, the free edges of the lips can be bent in, those of the lower section over and those of the upper section under, the wire, to thereby lock the sections together to form the complete box or inclosed casing, which might be said to be composed of two ordinary pan shaped poppers brought together.

The wire 10, is preferably U-shape with parallel legs extending along the opposite side edges of the box centrally between the flat sides 4, thereof, and with its cross head arranged centrally across the front end wall of the box, and having its central portion twisted and projected forwardly and constituting a shank 11, by which the box is secured to the handle 1.

It is evident that various modifications, changes and variations might be resorted to without departing from the spirit and scope of the invention, and hence I do not wish to limit myself to the exact disclosure hereof.

What I claim is:—

1. A corn popper comprising a box adapted to receive the corn to be popped, said box being reversible to present any side thereof to the popping heat, said box having a popped corn discharge opening, and a separating screen arranged within the box internally dividing the same into two popping chambers and extending through said discharge opening and a distance therebeyond, said screen arranged to hold the popped corn and to permit the unpopped corn to pass therethrough when the box is reversed, said screen arranged to permit popped corn from either of its sides to discharge through said opening.

2. A corn popper comprising a box having a popped corn discharge opening, and a vertically swingable separating screen arranged within said box and projecting through said opening and extending a distance therebeyond forming an exterior guide for the popped corn.

3. A corn popper comprising a box having a discharge opening at its rear end and a handle projecting from its opposite end, and a vertically swingable separating screen arranged within the box and projecting through said opening and at its rear end having guards for both sides of the screen.

4. A corn popper comprising a box having a discharge opening, and a vertically swingable screen dividing the box into two popping chambers, said screen extending through said opening and forming a discharge spout swingable therein as the box is reversed.

5. A corn popper comprising a box having opposite reticulated side walls and an opening in its rear end, said box composed of two similar sections, a lock uniting said sections and embodying a length of wire passing through adjacent side walls of said sections, and a separating screen arranged in the box and dividing the interior thereof into two popping chambers.

6. A corn popper comprising a box open at its rear end, a vertically swingable separating screen arranged within the box upon a centrally arranged axis and projecting through said opening and a distance therebeyond to form an exterior discharge spout.

7. A corn popper comprising a box provided with a discharge opening, a separating screen mounted vertically swingable within said box and projecting through said opening, and a discharge spout formed on the projecting portion of said screen.

In testimony whereof I affix my signature in the presence of two witnesses.

FRANK A. TRAVER.

Witnesses:
O. A. KREMERS,
F. E. HOECK.

Copies of this patent may be obtained for five cents each, by addressing the "Commissioner of Patents, Washington, D. C."